US006393126B1

(12) United States Patent
van der Kaay et al.

(10) Patent No.: US 6,393,126 B1
(45) Date of Patent: May 21, 2002

(54) SYSTEM AND METHODS FOR GENERATING TRUSTED AND AUTHENTICATABLE TIME STAMPS FOR ELECTRONIC DOCUMENTS

(75) Inventors: Erik H. van der Kaay, Corona del Mar; David Tyo, Yorba Linda; David Robinson; Gregory L. Dowd, both of San Jose, all of CA (US)

(73) Assignee: Datum, Inc., Irvine, CA (US)

( * ) Notice: Subject to any disclaimer, the term of this patent is extended or adjusted under 35 U.S.C. 154(b) by 0 days.

(21) Appl. No.: 09/510,408

(22) Filed: Feb. 22, 2000

Related U.S. Application Data

(63) Continuation-in-part of application No. 09/338,074, filed on Jun. 23, 1999.

(51) Int. Cl.[7] .............................................. H04N 7/167
(52) U.S. Cl. ...................... 380/241; 380/36; 380/239; 713/185; 713/178; 713/172; 713/159
(58) Field of Search ................................ 380/239, 241, 380/36; 713/159, 172, 178, 185

(56) References Cited

U.S. PATENT DOCUMENTS

| | | | |
|---|---|---|---|
| 4,709,347 A | 11/1987 | Kirk | 364/900 |
| 4,816,989 A | 3/1989 | Finn et al. | 364/200 |
| 5,001,752 A | 3/1991 | Fischer | 380/23 |
| 5,027,297 A | 6/1991 | Garitty et al. | 364/569 |
| 5,136,647 A | 8/1992 | Haber et al. | 380/49 |
| 5,323,315 A | 6/1994 | Highbloom | 364/408 |
| 5,386,542 A | 1/1995 | Brann et al. | 395/550 |
| 5,422,953 A | 6/1995 | Fischer | 380/23 |
| 5,444,780 A | 8/1995 | Hartman, Jr. | 380/30 |
| 5,500,897 A | * 3/1996 | Hartman, Jr. | 380/25 |
| 5,504,878 A | 4/1996 | Coscarella et al. | 395/550 |
| 5,689,688 A | 11/1997 | Strong et al. | 395/553 |
| 5,745,574 A | 4/1998 | Muftic | 380/23 |
| 5,748,740 A | 5/1998 | Curry et al. | 380/25 |
| 5,768,382 A | 6/1998 | Schneier et al. | 380/23 |
| 5,923,763 A | * 7/1999 | Walker et al. | 380/51 |
| 6,148,082 A | * 11/2000 | Slattery et al. | 380/212 |

* cited by examiner

*Primary Examiner*—Albert Decady
*Assistant Examiner*—Todd Jack
(74) *Attorney, Agent, or Firm*—Knobbe Martens Olson & Bear LLP

(57) ABSTRACT

A trusted time infrastructure system provides time stamps for electronic documents from a local source. The system comprises a trusted master clock, a trusted local clock, and a network operations center. The trusted master clock and network operations center are located within secure environments controlled by a trusted third party. The trusted local clock may be located in an insecure environment. The trusted master clock is certified to be synchronized with an accepted time standard, such as a national time server. The trusted local clock, which issues time stamps, is certified to be synchronized with the trusted master clock. Time stamps and certifications are signed by the issuing device using public key cryptography to enable subsequent authentication. The network operations center logs clock certifications and responds to requests for authentication of time stamps.

29 Claims, 8 Drawing Sheets

SYSTEM AND METHODS FOR GENERATING TRUSTED AND AUTHENTICATABLE TIME STAMPS FOR ELECTRONIC DOCUMENTS

RELATED APPLICATIONS

This is a continuation-in-part application of a copending application entitled "System and Method for Providing a Trusted Third Party Clock and Trusted Local Clock," U.S. application Ser. No. 09/338,074, filed Jun. 23, 1999, which is hereby incorporated by reference.

BACKGROUND OF THE INVENTION

1. Field of the Invention

This invention relates generally to methods and systems for providing and verifying a trusted source of certified time, and, more particularly, the invention relates to digitally time stamping electronic documents wherein the time stamp can be validated and verified as synchronized with an accepted standard.

2. Description of the Related Art

Electronic Commerce (e-commerce) is a rapidly expanding aspect of the economic world and demands the use of Electronic Commerce transactions. Such transactions, however, have outgrown the policies and controls that regulate traditional Paper Commerce. For example, a paper document can be typed, signed in ink, and mailed through the post office. The post office can then affix a time stamp and receipt at the destination. There are long standing legal and accounting policies that authenticate this type of transaction. When an electronic document is sent between two computers, however, it does not leave behind the same degree of tangible evidence. Even if the electronic document is stored in a computer's memory, the contents, signature, and time stamp can be manipulated by anyone with access to the computer.

Accounting and legal regulatory bodies are currently developing and mandating Electronic Commerce certification processes to provide reliable authentication for electronic transactions much like those available for paper transactions. Many of the certification processes depend on the creation of a digital signature using public key cryptography that authenticates the "Who," "What," and "When" of a document.

Public key cryptography was developed in the 1970s to solve problems involved with symmetric key cryptography. In public key cryptography systems, two corresponding keys are generated. One key, called a private key, is held privately by the keyholder. A second key, called a public key, is published openly for anyone that wants to secretly communicate with the keyholder or verify the authenticity of messages sent by the keyholder. Because the sender and the receiver use different keys, public key cryptography is also known as asymmetric key cryptography.

To send a secret message with public key cryptography, an entity "A" encrypts a message using the public key of an entity "B." "A" then transmits the encrypted message to "B." "B" decrypts the encrypted message with "B"'s corresponding private key. Since the message encrypted with "B"'s public key can only be decrypted with the corresponding private key, held only by "B," the privacy of the communication is ensured.

To authenticate the content and origin of a message, "A" uses a one-way hash function to create a message digest. A message digest is a fixed length data element that uniquely represents the source message. Since the hash function is one-way, nothing about the content of the source message can be inferred from the message digest. For example, two message digests from two messages that differ by only one character would appear to be a completely random reordering of characters. "A" then signs the message by encrypting the digest using "A"'s private key. The signature is typically appended to the message itself. "A" then transmits the signed message to "B." In order to authenticate the received message, "B" uses the same one-way hash functions used by "A" to create a message digest from the received message. "B" then decrypts the encrypted digest using "A"'s public key. If the decrypted digest matches the digest created from the received message, then the received message must be the identical message from which the decrypted digest was originally derived. Furthermore, that the decrypted digest was decrypted using "A"'s public key ensures that the decrypted digest was originally encrypted with "A"'s private key. The successful matching of digests, therefore, ensures that the message received by "B" is the identical message signed by "A."

Encrypting a message itself establishes secrecy. Signing a message provides for message authentication and establishes the "who" and "what" of a message. Encryption and signatures can also be combined by encrypting a message before creating a message digest and signature. By combining encryption and signatures, secret, authenticatable communications can be accomplished.

A very significant attribute of public key cryptography is that there is no need to share a secret key or to transmit a secret key from the keyholder to a proposed communication partner. It is, however, necessary to establish credibility for who owns public and private keys. For instance, "C" could claim to be "A" and send a message to "B." To prevent being fooled, "B" needs to be sure that "A"'s public key, is in fact paired with the private key owned by a real "A." A Certification Authority (CA) solves this problem. (Note: The use of the word "certification" in certification authority relates to the association of public keys with particular owners and is distinct from the concept of a Time Calibration Certificate (TCCert), as used herein, which relates to the certification of a clock as synchronized with an accepted standard.) CAs provide digital certificates which contain public keys and are used to transmit the public keys in a secure, authenticated manner to participants in e-commerce transactions.

In addition to the cryptographic techniques and digital certificates provided by CAs, security and authentication of transactions is also supported by an extensive body of protocol standards. It is necessary for "A" to format messages, signatures, message digests, etc., with protocols that can be recognized by "B." Cryptography, digital certificates, protocols, and standards together make up what is termed the Public Key Infrastructure (PKI). With PKI, one can easily guarantee the "who" and "what" of a transaction.

"When" is a measure of the time at which an event occurred and is a concept easily taken for granted. A worldwide system of time standardization is in operation. Each country that is signatory to the Treaty of the Meter maintains a National Timing Laboratory (NTL), which houses the local country's standard time clock. These clocks are kept synchronized to the world standard of time maintained in Paris, France. The world standard for commercial time is Coordinated Universal Time (UTC). In the United States, Congress has mandated that official United States "time" follow the clock maintained by the National Institute of Standards and Technology (NIST), located in Boulder, Colorado. This standard is referred to as UTC-NIST. Any time stamp for a transaction that must survive technical, auditing, or legal scrutiny must be made by a clock that is synchronized to UTC-NIST, and the synchronization process must be "traceable." Throughout this document, reference is made to UTC-NIST but the invention described is applicable to operation in any country and with standard time clocks maintained by any country's respective national timing laboratory.

The use of "traceable" clocks in paper commerce has been sufficient to provide the "when" of ordinary paper transactions. While there have been numerous cases of falsification of dates on paper documents, the risk to commerce has been relatively small. In the case of e-commerce, however, falsification of dates creates a much greater risk because it is possible to invade computer-directed processes and effect fraud on a very large scale. Such computer crimes frequently involve falsification of electronic time stamps; and for this very reason, protection of the electronic clocks that generate those time stamps from tampering is a high priority in Electronic Commerce.

Current network procedures provide for the synchronization of all workstation clocks in a network. NIST and other agencies provide network time servers that have clocks traceable to UTC-NIST. Client workstations can synchronize their time with the network time servers through a common protocol. The Network Time Protocol (NTP) is commonly used in TCP/IP networks such as the Internet, but other protocols are also used.

Unfortunately, once a local workstation clock is synchronized to the network time server, its time may be subject to manipulation regardless of the reliability of the source network time server. Thus far, little work has been done to ensure that the source of the time used to generate time stamps can be trusted. Today, the majority of applications utilizing time stamps simply use the system clock from their host system. Procedures for setting or offsetting a system clock are commonly known. Thus, there is no inherent trust in a system clock in a conventional system.

Attempts to overcome this problem include time stamp sequencing wherein the time stamp incorporates information regarding the order in which documents are time stamped in relation to other time-stamped documents. (See, for example, U.S. Pat. No. 5,136,647 to Haber et al.) Other attempts to overcome the problem incorporate the use of other time sources such as NTP or Global Positioning System (GPS). While these attempts are significant improvements over using the system clock, the improvements still fall short of fitting into the trust models required for electronic business today.

Still other systems employ the use of certified time that is maintained by a trusted third party's system located outside the local network. The trusted third party system remains synchronized with UTC-NIST through a common protocol. The local network application server then establishes communication with the third party's system whereby a data object (document or message digest) is sent to the third party system where a "time stamp" is affixed to the data object, either in clear text or in cryptographically embedded text. Such a system may be impractical, however, considering the need for external communication for each instance of time stamping, especially when many time stamps are required by the local network.

Another system introduces a local clock into the local network, thus avoiding the problems associated with obtaining time stamps from an outside source. The local clock must be periodically synchronized with a UTC-NIST traceable clock. In order to avoid frequent certification and calibration between the local clock and the UTC-NIST traceable clock, the local clock is advantageously a cesium atomic clock. Cesium atomic clocks are commercially available and their frequency, and hence time, is derived from an atomic phenomena caused by the energy difference of certain cesium atom electron orbits. Thus, as long as the cesium atomic clock is operating, it will be accurate enough to satisfy most practical applications. Such clocks only lose one second in 30,000 years of normal operation. For this reason, cesium atomic clocks are termed "primary reference sources." Unfortunately, when used locally, there is still the possibility that the time value in the clock could, through system malfunction or intentional manipulation, be altered to an incorrect value that would not be apparent to a user.

Trusted time, in the context of the present invention, is time that is certified to be traceable to the legal time source for the application in which it is being used. The legal time source for commercial applications operating in the United States, as legislatively mandated by Congress, is the National Institute of Standards and Technology (NIST). The infrastructure for providing trusted time must provide a strong trust model, including a certification log for auditing and to prevent repudiation at a later date.

The need for trusted time has become recognized over the last two years as marked by the launch of standardization activities in the The Internet Engineering Task Force (IETF). In addition, most Certification Authority (CA) product and service vendors have announced development activities and new products in this area. The present disclosure describes a Trusted Time Infrastructure (TTI) that meets the requirements for providing trusted time. The present disclosure also shows how the TTI fits in with the trust models and cryptographic standards that have been developed to ensure that secure and legally binding electronic transactions can take place today.

SUMMARY OF THE INVENTION

A Trusted Time Infrastructure (TTI) system provides time stamps, in the form of trusted temporal tokens, for electronic documents from a local source. A preferred embodiment of the system comprises a trusted master clock, a trusted local clock, and a network operations center. The trusted master clock and the network operations center are located within secure environments controlled by a trusted third party. The trusted local clock may be located in an insecure environment. The trusted master clock is certified to be synchronized with an accepted time standard, such as a national time server. The trusted local clock, which issues time stamps, is certified to be synchronized with the trusted master clock. Time stamps and certifications are signed by the issuing device using public key cryptography to enable subsequent authentication. The network operations center logs clock certifications and responds to requests for authentication of time stamps.

The delivery of trusted time by the trusted local clock is ensured by: (1) the physical security of the devices in the system; (2) authentication of communications between the devices in the system; (3) the link of certifications through which time can be traced to an accepted standard; and (4) the specified accuracy of clocks within the system.

In an alternative embodiment, each issued time calibration certificate incorporates the time calibration certificate of the issuing clock. The time calibration certificate of the trusted local clock is then incorporated into the issued trusted temporal tokens. Accordingly, the chain of certifications from which trusted time is derived from an accepted source is incorporated into each trusted temporal token.

In another embodiment, the system provides a local source of trusted time through a trusted local clock. In still another embodiment, methods of billing clients are based upon the number of trusted temporal tokens issued or, alternatively, based upon the number of clock certifications performed. Billing features of the system support the billing methods. These and other aspects of the present invention will be further described in the detailed description that follows.

BRIEF DESCRIPTION OF THE DRAWINGS

The preferred embodiments of the present invention are described below in connection with the drawings in which like reference numbers represent corresponding components throughout, and in which.

DETAILED DESCRIPTION OF THE PREFERRED EMBODIMENT

In the following description, reference is made to the accompanying drawings, which form a part hereof, and which show, by way of illustration, specific embodiments in which the invention may be practiced. It is to be understood that other embodiments may be utilized and structural changes may be made without departing from the scope of the present invention. Where possible, the same reference numbers will be used throughout the drawings to refer to the same or like components. Numerous specific details are set forth in order to provide a thorough understanding of the present invention. However, it will be understood by one skilled in the art that the present invention may be practiced without the specific details or with certain alternative equivalent devices and methods to those described herein. In other instances, wellknown methods, procedures, components, and devices have not been described in detail so as not to unnecessarily obscure aspects of the present invention.

1. Global Timing Hierarchy

Figure 1:
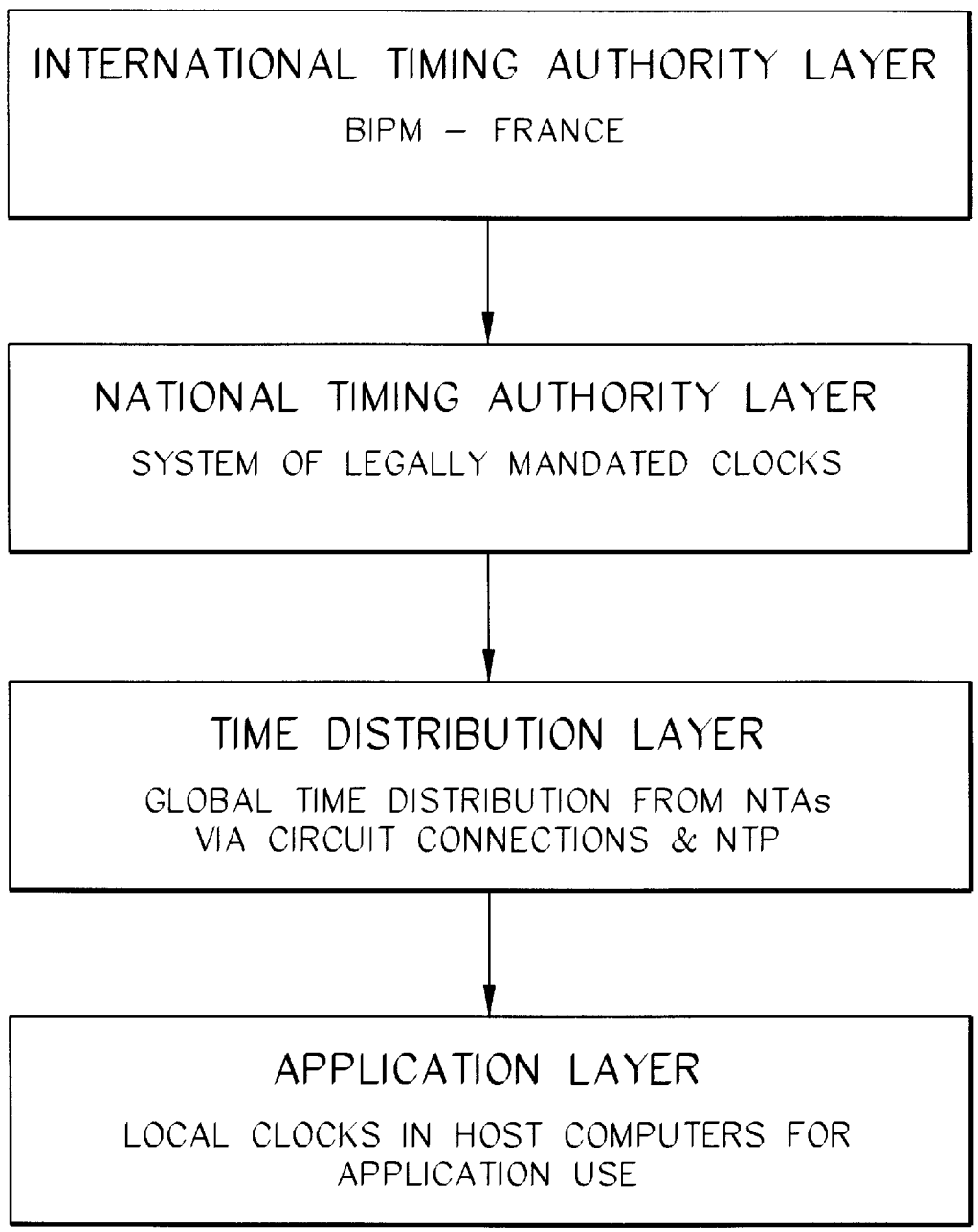
FIG. 1 illustrates the four principal levels of the global timing hierarchy.

As illustrated in FIG. 1, the global timing hierarchy has four principal levels:

1. International Timing Authority (BIPM) Layer
2. National Timing Authority (NTA) Layer
3. Timing Distribution Layer
4. Application Layer The Trusted Time Infrastructure (TTI) provides a system for commercial or private timing distribution services to deliver to the application layer a "trusted temporal token" or "trusted time stamp" that cryptographically binds the current time of day derived from the NTA to a unique data request submitted by an application. Such a request may be made in response to events, transactions, or document submittals. public key digital signatures are preferably used as the binding mechanism to ensure the identity of the time distribution service and to protect the temporal token from undetected manipulation.

The time delivered by the TTI is preferably Universal Coordinated Time (UTC). The means by which the NTAs synchronize their UTC clocks (e.g., UTC(NIST)) with the International Bureau of Weights and Measures (BIPM) in France is outside of the scope of this disclosure. However, the UTC delivered by most of the major NTAs can be expected to be within nanoseconds of UTC (BIPM), while any of the other NTAs are still within microseconds of UTC (BIPM). Thus, for trusted time applications, where time is typically certified to be accurate to within 100 milliseconds at the application layer, the choice of which NTA to use is a legal issue for a particular country and not one of accuracy.

2. Trusted Time Infrastructure (TTI)

Figure 2:
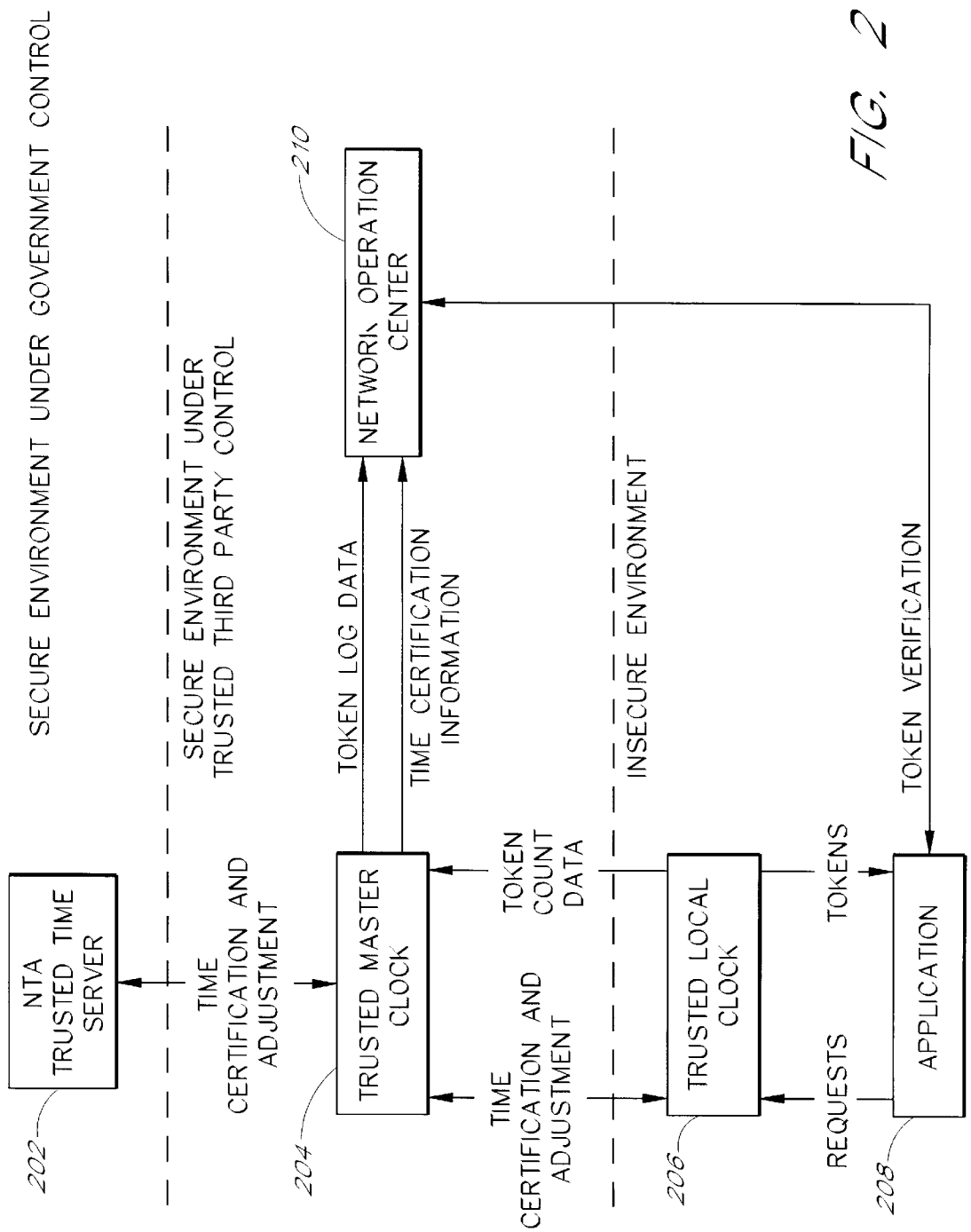
FIG. 2 illustrates a schematic of the key components of a preferred embodiment of the TTI and the key transactions between these components.

FIG. 2 illustrates a schematic of the key components of a preferred embodiment of the TTI and also illustrates the key transactions between these components. The embodiment of FIG. 2 comprises an NTA Trusted Time Server (NTTS) 202, a Trusted Master Clock or Trusted Third Party Clock (TMC) 204, a Network Operations Center (NOC) 210, a Trusted Local Clock (TLC) 206, and an application 208. Although only one instance of each component is depicted in FIG. 2 for instructive purposes, numerous instances of each element may be present in an actual TTI system.

2.1 Secure Communication Through Public Key Infrastructure (PKI)

The various elements in the TTI system communicate securely using PKI. Although PKI is often used to encrypt confidential communications, PKI can also be used to verify the origin of a communication through digital signatures. In the TTI system, the privacy of the communication between elements is generally not an issue. Instead, it is the authenticity of the communication that is generally of concern.

PKI authentication supports two aspects of the TTI system. First, PKI authentication supports authentication of communications between elements in the TTI system in order to maintain the integrity of the system as a whole. For example, if a Trusted Master Clock (TMC) 204 communicates with a Trusted Local Clock (TLC) 206 in order certify its time calibration, the TMC 204 must know for sure the identity of the TLC 206 that it is certifying. In another example, if a TMC 204 notifies the Network Operations Center (NOC) 210 of a time calibration certification of a TLC 206, the NOC 210 must be able to authenticate the identity of the certifying TMC 204. In an additional example, if a TMC 204 is capable of adjusting the time of a TLC 206, the TLC 206 must be able to verify that it is indeed a valid TMC 204 that is adjusting its time. In accordance with this first aspect, trusted temporal tokens preferably include the signed time calibration certification of the certifying clock. The NOC 210, through its PKI authentication capabilities, provides a system through which trusted time can be traced to the NTA Trusted Time Server (NTTS) 202 from any TLC 206 through authenticated time calibration certifications. In other words, the source of time from which a trusted temporal token has been derived can be traced back through signed time certifications to the NTTS 202.

A second aspect in which PKI authentication supports the TTI system is in authentication of temporal tokens themselves. The trusted temporal token includes a signed concatenation of a digest of the message to be time stamped as well as the time calibration certification of the issuing TLC 206. This signed concatenation allows the authenticity of the temporal token itself to be verified as being unaltered and issued by a particular TLC 206.

2.2 Key System Elements 2.2.1 Trusted Time Server

The NTA Trusted Time Server (NTTS) 202 is the highest level clock in the TTI and is preferably located in a secure environment under government control. The NTTS 202 is the source of legal time from which the TTI derives its trusted time. The secure environment should be accessible only to trusted agents of the government timing authority (e.g. NIST), in order to ensure the integrity of the NTTS 202. The NTA is responsible for monitoring the accuracy of the NTTS-produced time and the operation of the NTTS 202 itself.

The NTTS 202 is responsible for measuring the clock offsets of the TMC 204 units. The NTTS 202 preferably performs this measurement over the Public Switched Telephone Network (PSTN). To measure the clock offsets of the TMCs, the NTTS 202 preferably supports a variant of Network Time Protocol (NTP) called Secure NTP (SNTP). NTP has been in use as a standard Internet Protocol since the early 1980s. SNTP is currently before the IETF as a draft protocol. It differs from NTP primarily in the establishment of a more robust authentication scheme based on more modern PKI techniques. For redundancy, two NTTS units are preferably located at the NTA, preferably at geographically separate locations.

2.2.2 Trusted Master Clock

The Trusted Master Clock (TMC) 204 is an intermediary clock that serves to pass a trusted source of time from the NTA Trusted Time Server (NTTS) 202 to the Trusted Local Clock (TLC) 206 where the trusted time is actually used. The TMC 204 is preferably a stand-alone server located in a secure environment under the control of a trusted third party. This trusted third party can be the entity or organization implementing the whole TTI system or part of the TTI system. Again, the secure environment is preferably accessible only to trusted agents of the trusted third party to prevent tampering with the TMC 204.

Only one TMC is illustrated in FIG. 2 for teaching purposes. Typically, however, the TTI network will contain a minimum of two TMCs. In some configurations, two or more TMCs may be linked in series between the NTTS 202 and the TLC 206. These and other configurations will be shown below.

The TMC 204 preferably comprises a Rubidium oscillator; a GPS receiver for monitoring the oscillator; cryptographic hardware; and a timing engine that generates trusted time. Each TMC 204 has a set of TLCs that it is responsible for time certifying. These sets of TLCs will be assigned by the Network Operations Center (NOC) 210. Preferably, the NOC 210 will ensure that at least two TMCs will be assigned to each TLC. This structure ensures sufficient redundancy so that the failure of a single TMC will not affect the operation and trust of the TLCs. It should be understood that a non-redundant configuration can be advantageously used when redundancy is not a concern.

The TMC 204 preferably uses the NT operating system configured for enhanced security. The TMC housing is designed to meet NIST Federal Information Processing Standard (FIPS) 140-1 Level 3 physical protection and tamper detection requirements (FIPS 140-1 is titled "Security Requirements for Cryptographic Modules"). Cryptographic calculations, including key generation, are performed by dedicated hardware. In the preferred embodiment, the private signing key of the TMC 204 is never exported from the cryptographic card. The cryptographic device also contains a high quality random number generator that can be used to generate new PKI key pairs. Sensitive cryptographic information is preferably contained in battery-backed memory, which will be erased in the event of a tamper alarm. The TMC 204 is preferably designed to receive a NIST validation rating of FIPS 140-1 Level 1 overall and Level 3 for physical security.

Audit trails are created for all TMC events, including all operator actions (logs include operator IDs), alarms, time certifications, and all remote NOC communications. These logs are digitally signed to prevent (by detection) subsequent forgery or alteration. The TMC 204 will typically include a GPS receiver that can be used to initialize the TMC 204 and to monitor the health of the TMC 204. If any abnormalities are detected in the TMC time source, the TMC 204 goes off line, attempts to isolate the problem, and shuts down.

The TMC 204 uses Secure NTP (SNTP) and User Datagram Protocol (UDP) to access each of its assigned TLCs periodically to measure its time offset. If the time of TLC 206 is within a certain offset (typically 100 ms) from the NTTS 202, the TMC 204 certifies the TLC 206 to be within that offset. The TMC 204 may also send small time corrections to the TLC 206 that can be used to make adjustments to the TLC 206 clock to keep it within specification. If a TMC 204 finds that a TLC 206 has a valid, recent Time Calibration Certificate (TCCert) then it takes no action.

2.2.3 Network Operations Center

The Network Operations Center (NOC) 210 serves as the central control facility for the TTI system. The NOC 210 is preferably located in a secure environment under the control of a trusted third party.

Figure 3:
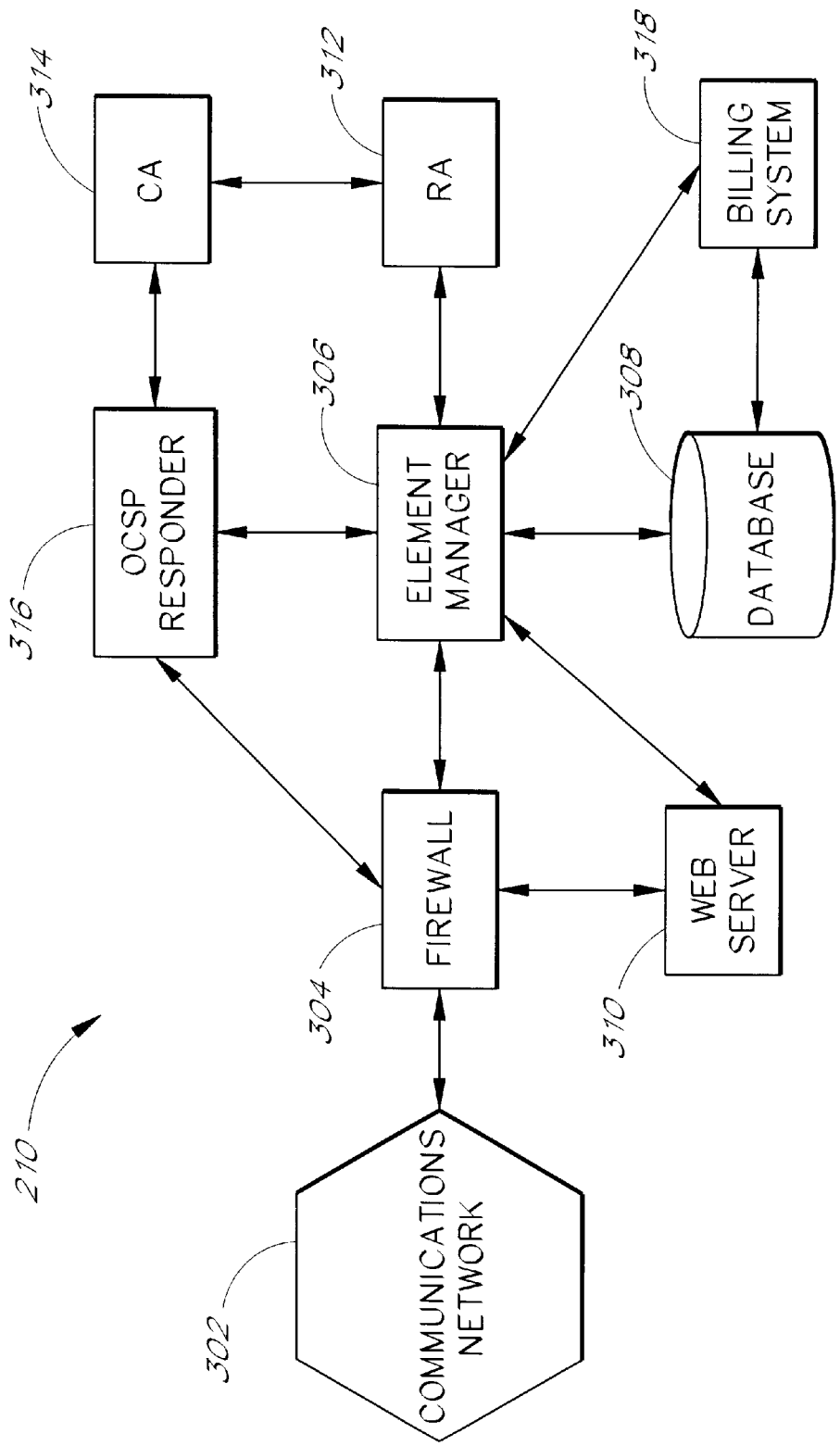
FIG. 3 illustrates a functional block diagram of the Network Operations Center.

FIG. 3 illustrates a functional block diagram of the NOC 210. The NOC 210 communicates with the various elements of the TTI through a communications network 302. The communications network 302 may comprise the Public Switched Telephone Network (PSTN), the Internet, and/or other computer networks. A firewall 304 protects the internal systems of the NOC 210 from external attack through the communications network 302. The NOC 210 comprises an element manager 306, which is a configuration and maintenance system that has the ability to remotely configure and monitor the NTTS 202, TMCs 204, and TLCs 206 using a secure management protocol. In addition, the NOC 210 comprises a central database 308 that is used to store all TMC and TLC time certification logs.

The NOC 210 also comprises a web server 310 that handles temporal token verification requests sent via the World Wide Web. The web server 310 interfaces with the element manager 306 to initiate a verification action and to return the response to the requester. The web server 310 preferably uses Secure Sockets Layer (SSL) with server authentication in order to encrypt and authenticate the server data exchanged between the client and the server. The NOC 210 further comprises a billing system 312 for trusted time service subscribers. The billing system 312 logs data regarding the number of tokens issued by a TLC 206.

The NOC 210 comprises three additional functional components that implement the PKI authentication capability of the TTI system. The Registration Authority (RA) 312 associates each device in the TTI system with a name. In this manner, TTI devices can be identified, monitored, and controlled. The Certification Authority (CA) 314 associates a public key with each device using the name of the device provided by the RA 312. The Online Certificate Status Protocol (OCSP) responder 316 responds to requests for digital certificates for devices in the TTI system. The OCSP responder 316 serves as a trusted source of digital certificates. Digital certificates provide a data structure associating a public key with a signing device and allow verification/ authentication of the signed communications of TTI devices. Since the NOC 210 knows all elements comprising the TTI, the NOC 210 acts as an RA 312 to the CA 314 for the issuance of digital certificates to the TTI elements. The TTI preferably uses ITU-T X.509v3 digital certificates. Each element within the TTI preferably has a distinguished name so that it may be uniquely identified. The name structure is preferably aligned with the International Telecommunications Union—Telecommunication Standardization Sector (ITU-T) X.501/X.520 standards for distinguished names. The use of an RA, a CA, and an OCSP responder is known in the art and information regarding this topic is available from entities such as the IETF (Internet Engineering Task Force).

The NOC 210 preferably also comprises a billing system 318 that interacts with the element manager 306 and the database 308 in order to assemble client billing information. A number of different billing schemes will be discussed in the section on billing below.

2.2.4 Trusted Local Clock

The Trusted Local Clock (TLC) 206 provides trusted time, preferably in the form of a trusted temporal token, to the application 208 on request. The TLC 206 is hosted in a customer-owned server and is preferably a PCIv2.1 compliant card that is tamper-resistant and is assumed to be operating in an insecure host in an insecure environment.

The TLC 206 comprises an oscillator and a timing engine, which generates trusted time. A Time Calibration Certificate (TCCert) typically has a period during which it is valid. The range of accuracy specified by the TCCert during the valid period accounts for the accuracy of the TLC's oscillator and timing engine. The TCCert therefore, serves as assurance of the accuracy, during the valid period, of the certified clock.

The TLC 206 preferably uses a real time operating system to control the on-card functions. The TLC 206 preferably has its own Ethernet TCP/IP connection for communications with the TMC 204 and NOC 210.

Cryptographic calculations in the TLC 206 are preferably performed using a dedicated hardware PCMCIA (Personal Computer Memory Card International Association) cryptography engine. This cryptographic device preferably also contains a high quality pseudorandom number generator. Key generation is performed on the PCMCIA device. The private key for the TLC 206 will preferably never be exported from the PCMCIA cryptography engine. Sensitive cryptographic information is contained in battery-backed memory that is preferably erased in the event of a tamper alarm. The TLC 206 preferably has a NIST validation rating of FIPS 140-1 Level 1 overall and Level 3 for physical security. Audit trails are preferably created for all TLC events, including all operator actions (logs include operator IDs), alarms, time certifications performed, temporal tokens issued, and all remote NOC 210 communications. These logs are digitally signed to prevent (by detection) subsequent forgery or alteration.

Like the TMC 204, the TLC 206 can include a GPS receiver to initialize the TLC 206 and to monitor the health of the TLC 206. If any abnormalities are detected in the TLC time source, the TLC 206 goes off line, attempts to isolate the problem, and shuts down.

2.2.5 Application

The application 208 is any process or device that requests trusted temporal tokens from the TLC 206. The application 208 can run on the same server that hosts the TLC 206 or the application 208 can run on any other machine in communication with the host server. The application 208 can request verification of a time stamp through the NOC 210. Alternatively, a time stamp obtained by an application 208 can be passed to another application. The other application can then perform the verification of the time stamp through the NOC 210.

Client applications 208 access the TLC 206 using a Trusted Time Application Program Interface (TTAPI). The TTAPI will communicate with its associated TLC 206 using the Transport Layer Security/Secure Sockets Layer (TLS/SSL) protocol. Server applications co-located with a TLC 206 access the TLC 206 using a Trusted Local Clock Application Program Interface.

Figure 4:
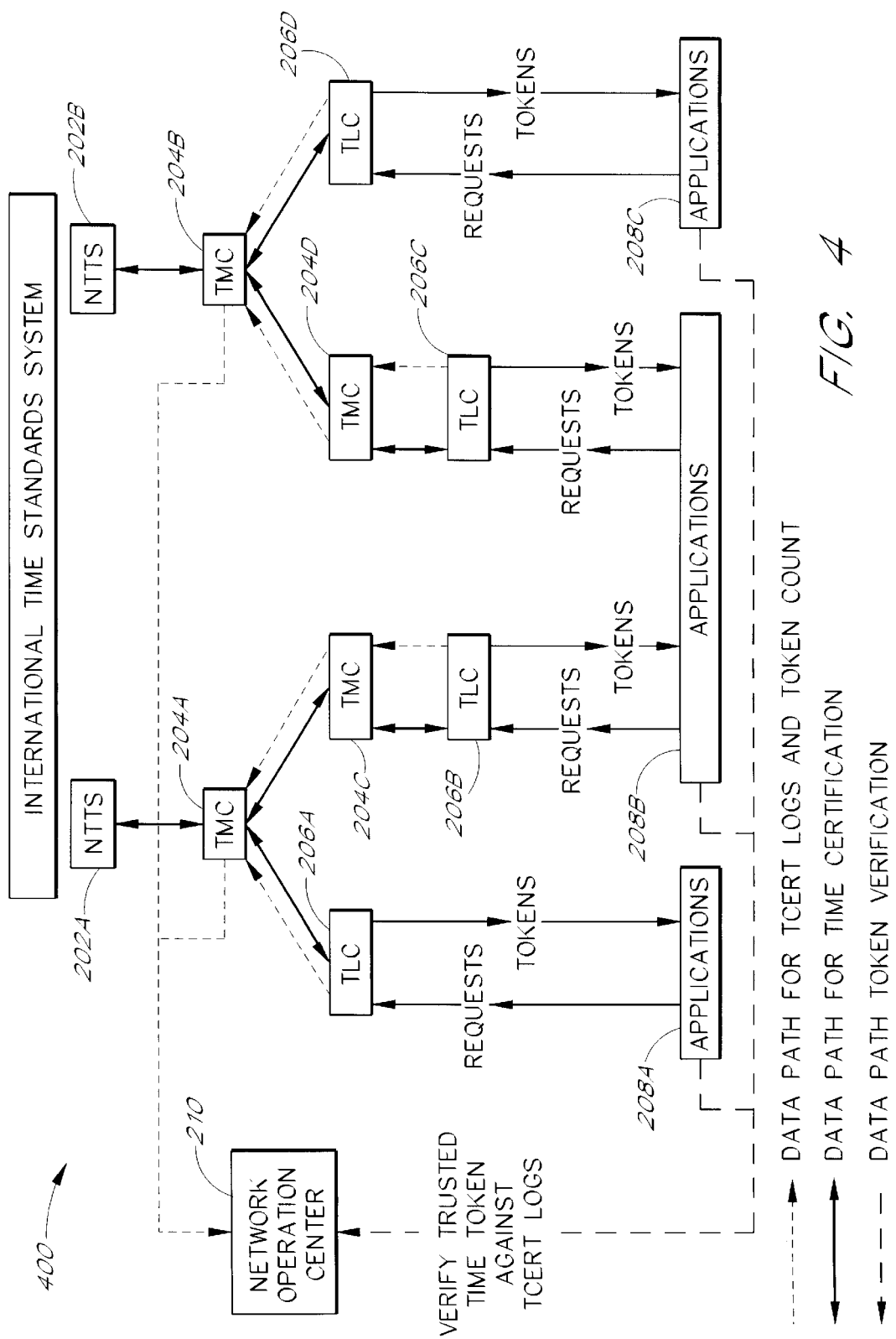
FIG. 4 illustrates one embodiment of a TTI system including a network of clocks and applications.

2.3 TTI System FIG. 4 illustrates one embodiment of a TTI system 400 including a network of clocks and applications. The system 400 comprises two NTTSs 202A-B for redundancy, preferably located in separate locations. Two TMCs 204A-B are directly certified by the NTTSs. The TMC 204A directly certifies a TLC 206A, while the TMC 204B directly certifies a TLC 206D. The TMC 204A also certifies another TMC 204C, which in turn certifies a TLC 206B, and similarly TMC 204B certifies TMC 204D, which in turn certifies TLC 206C. As illustrated, time certification logs are passed from the TLCs 206 up to the highest level TMCs 204 and then on to the NOC 210.

In the case that any clock fails, the device below that clock in the TTI can request service from an alternate clock. If the NTTS 202A fails, for example, the TMC 204A can request certification from the NTTS 202B. Similarly, if the TMC 204A fails, the TLC 206A and the TMC 204C can request certification from the TMC 204B.

Applications 208A, 208B, and 208C request trusted time tokens from their respective TLCs. Upon receiving trusted time tokens, the applications then can route verification requests to the NOC 210.

2.4 Application Bounded Time Service

Another embodiment of the TTI system or a portion thereof may be configured as an application bounded time service. In application bounded time service, trusted time is provided to a specific application offered by a single third party. For example, if Company X wants to sell certified e-mail gateway servers, each equipped with a TLC, the TLCs will be synchronized by TMCs operated by Company X. Company X's TMCs in turn are certified by TMCs of a trusted third party. Depending on the particular application, application bounded time service may require a separate NOC.

3. Calibration and Certification

This section describes how clock calibration and certification is performed in the TTI. Individual timing elements in the TTI are enabled for operation when they possess a Time Calibration Certificate (TCCert). In the preferred embodiment, TLCs cannot issue trusted temporal tokens unless they have been issued a valid TCCert. Also in the preferred embodiment, a TMC cannot certify a lower clock unless the TMC has been issued a valid TCCert.

After measuring the calibration of a lower clock, an upper clock issues a TCCcert to the lower clock to certify that the time of the lower clock is within a certain tolerance with respect to the upper clock. The upper clock signs the TCCerts to assure authenticity.

3.1 Procedural Overview

Figure 5:
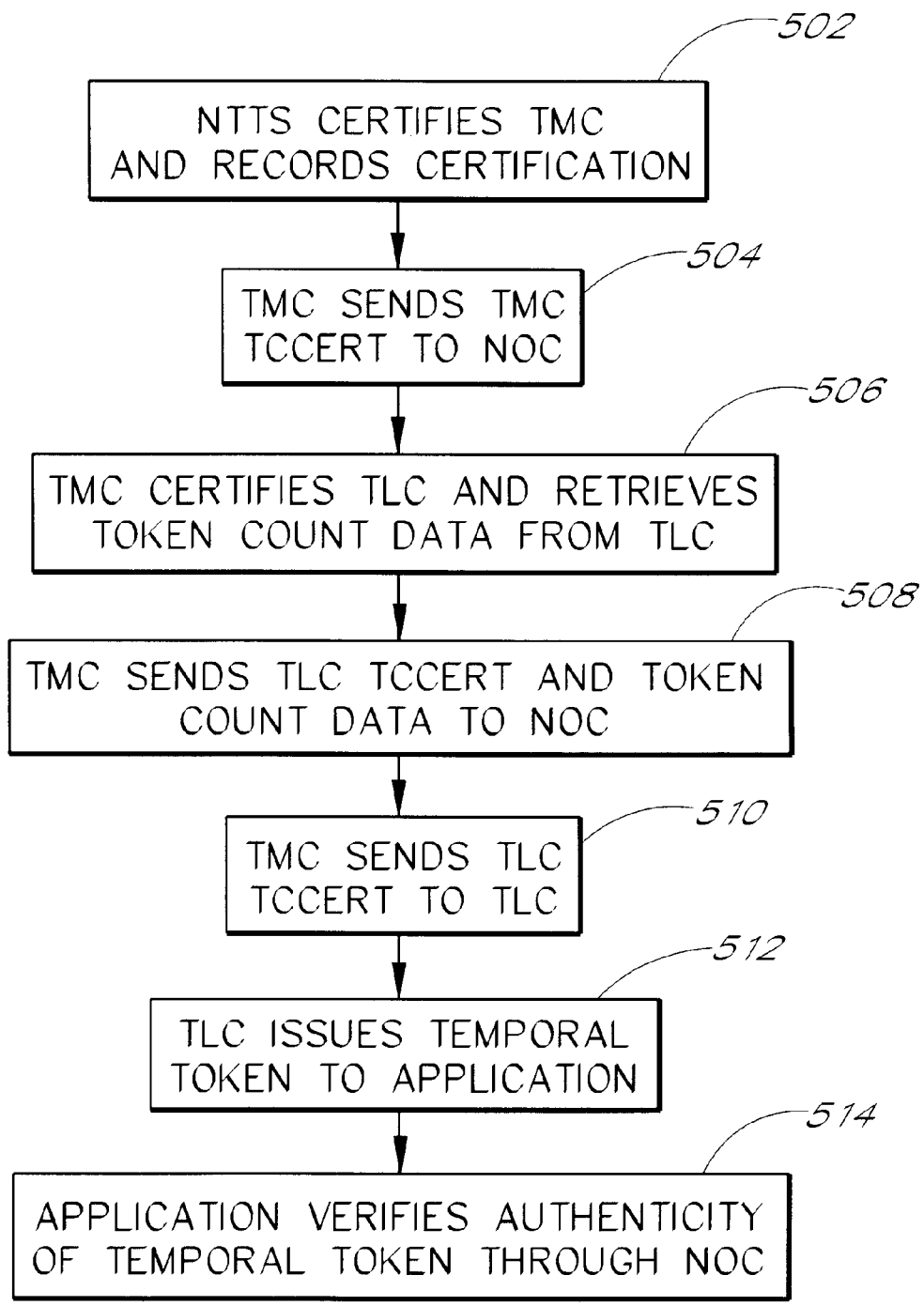
FIG. 5 illustrates an overview of the process by which a preferred embodiment of the TTI system generates trusted temporal tokens.

FIG. 5 illustrates an overview of the process by which a preferred embodiment of the TTI system generates trusted temporal tokens. The steps illustrated in FIG. 5 are also depicted by the arrows between elements in FIG. 3.

At a first step 502, the NTTS 202 certifies a TMC 204, sends a TCCert to the TMC 204, and records the certification locally. The TMC 204 then sends the TCCert to the NOC 210 for logging at a step 504. At this point, the TMC 204 possesses a valid TCCert and is capable of time certifying other lower clocks. At a step 506, the TMC 204 time certifies a TLC 206, sends a TCCert to the TLC 206, and records the certification. The TMC 204 also retrieves from the TLC 206 the number of trusted temporal tokens that the TLC 206 has issued since the last certification. This number is preferably used for billing purposes. At a step 508, the TMC 204 sends the TCCert and the token count of the TLC 206 to the NOC 210 for logging.

Once the TLC 206 has been certified, the TLC 206 is ready to issue trusted temporal tokens under its new TCCert. At a step 512, an application requests and the TLC 206 issues a new trusted temporal token. At a step 514, the application verifies the authenticity of the temporal token through the NOC, possibly at a future date.

3.2 TCCERT Generation

Figure 6:
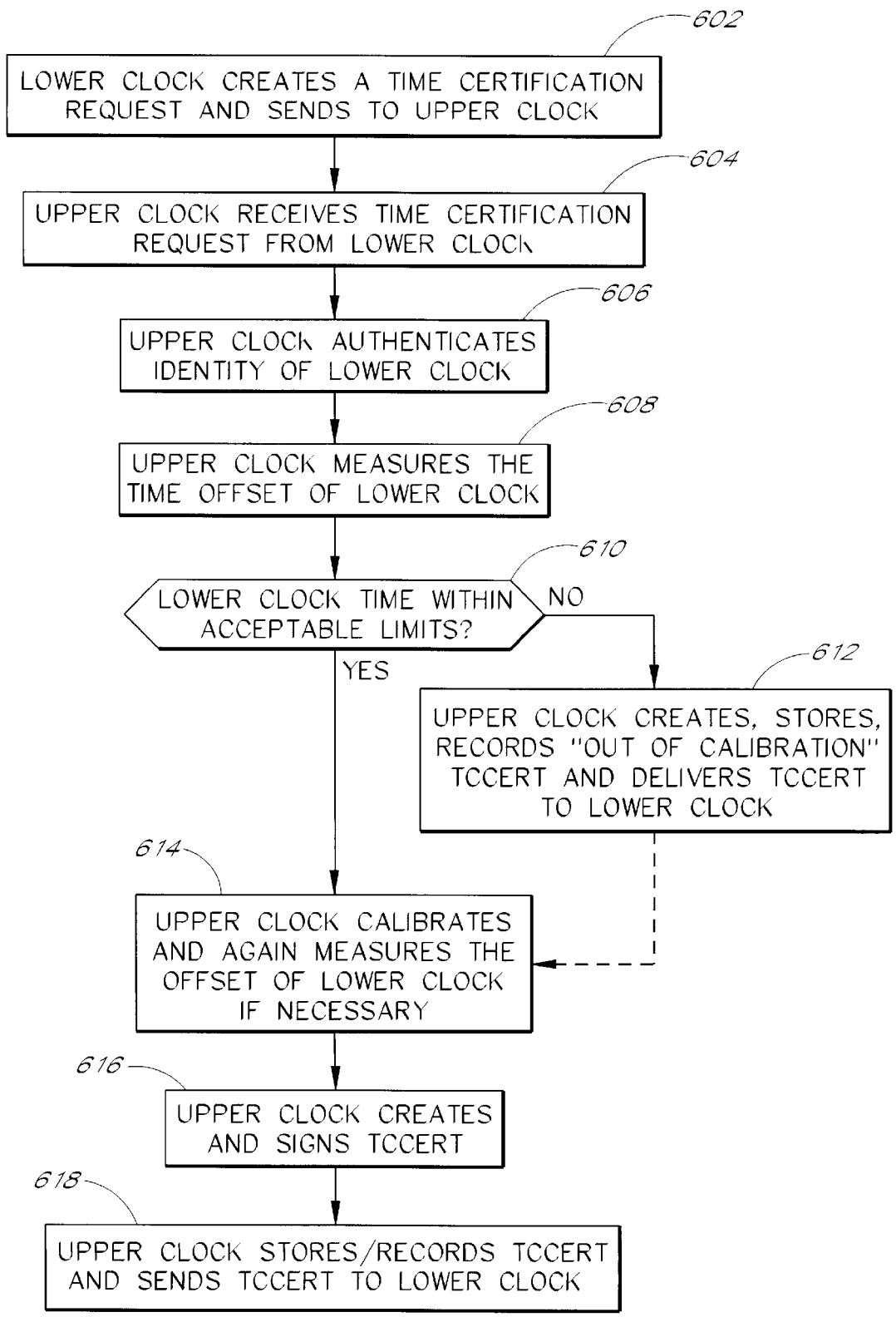
FIG. 6 illustrates a preferred embodiment of the process by which an upper clock certifies the time of a lower clock.

FIG. 6 illustrates a preferred embodiment of the process by which an upper clock certifies the time of a lower clock, as in steps 502 and 506 of FIG. 5. In the context of this illustration, an upper clock is intended to represent the NTTS or a TMC, while a lower clock is intended to represent another TMC or a TLC that is further down the chain of trusted time from the NTTS than the upper clock. When a higher level clock measures the offset of a lower clock and finds it within specification, a TCCert is created to record this determination. At a step 602, the lower clock creates a TCCert Request (TCCertReq) which preferably comprises:

Upper Clock ID;

Lower Clock ID;

Lower Clock Accuracy;

Lower Clock Signature Parameters; and

Lower Clock Signature (across above fields).

The lower clock then sends the TCCertReq to the upper clock. At a step 604 the upper clock receives the TCCertReq from the lower clock. The upper clock validates the signature of the lower clock and verifies that the lower clock ID is correct at a step 606. At a step 608, the upper clock measures the time offset of the lower clock using Secure NTP (SNTP).

The upper clock determines whether the offset of the lower clock is within acceptable limits at a step 610. If the lower clock is within acceptable limits, control passes to a step 614. At the step 614, the upper clock calibrates or adjusts and again measures the offset of the lower clock if necessary. At a step 616, the upper clock creates the TCCert by appending preferably the following fields to the TCCertReq:

TCCert Time;

Class of Service ID;

Lower Clock Offset;

TCCert Accuracy;

TCCert Expire Time;

Delay;

TCCert of Upper Clock (optionally); and

Upper Clock Signature Parameters.

To create the final TCCert, the upper clock appends its digital signature across the TCCertReq and the above-appended fields. By optionally including the TCCert of the upper clock in the TCCert of a lower clock, the complete trace of trusted time from the NTTS down to the lowest level can be encapsulated in each TCCert. At a step 618, the upper clock stores and records the TCCert and sends the TCCert to the lower clock.

If, at step 610, the time of the lower clock is found to be out of acceptable limits, it is possible that the clock has failed or has been tampered with. In this case, control passes to step 612. At step 612, the field TCCert Time is set to an illegal value, and the field Class of Service ID is set to "Out of Calibration." If a lower clock has been found to be out of calibration, any TCCerts or trusted temporal tokens issued by the lower clock since its last TCCert issuance should be considered suspect. Accordingly, the NOC 210 should be notified of the out of calibration measurement so that its database can reflect the invalidity of the previous TCCert and any trusted temporal tokens derived from it. If the NOC 210 has been notified of the out of calibration measurement, control is optionally passed back to step 614 for recalibration and recertification of the lower clock.

3.2.1 NTTS to TMC Calibration

The NTTS measures the clock offsets of the TMCs using PSTN connections and the SNTP protocol preferably once per day. The TMC clock offsets are expected to be within 10 milliseconds of UTC as provided by the NTTS. For successful clock offset measurements, the NTTS returns a TCCert indicating the TMC is enabled for time calibration of lower clocks. The NTTS TCCert Expiration Date is preferably seven (7) days from the date of TCCert issuance. In order to keep the NTA implementation simple, an NTA-level CA may not be used. Therefore, the NTTS may not explicitly verify the validity of the TMC certificates that it receives via SNTP with the respective CAs that produced them. Rather, the NTTS simply verifies that the received certificate matches the one that was loaded in its internal database during initialization for that timing service. Should a certificate be received via SNTP that is not in the NTTS database, the NTTS will log an error message with the received certificate and will refuse the connection.

The NTTS preferably logs all clock offset measurement information to paper. The printed records preferably contain the following information:

UTC Time of Calibration;

Trusted Master Clock Name;

Measured Offset;

NTTS Certificate Serial Number; and

Trusted Master Clock Certificate Serial Number.

3.2.2 TMC to TLC Calibration

Each TMC has a set of TLCs that it is responsible for certifying. Using SNTP, each TMC contacts each of the TLCs in its set once per day and requests its TCCert. If the received TCCert is less than 24 hours old, the TMC skips certification of that unit, closes the SNTP session and moves on to query the next TLC on its list. If the received TCCert is equal to or greater than 24 hours old, the TMC measures the TLC's time offset, computes the time correction, and sends this correction to the TLC clock to keep it within specification. The offset is again measured, and if the TLC clock is within specification, the TMC issues a TCCert to the TLC stating that it is within a certain offset from UTC. It is expected that the TMC will certify the TLC to be within 100 ms of UTC.

3.3 Trusted Time Guarantee

The preferred embodiment of the TTI system combines a number of aspects to guarantee that the time stamp on a trusted temporal token has been derived from a source of time that is synchronized with an accepted standard, or that the TTI system provides "trusted time." The first aspect is that the physical devices of which the TTI system is comprised are either located in physically secure, trusted, facilities, or are designed to be physically tamper proof. The second aspect is that communications between elements in the TTI system are authenticated, and, if necessary, encrypted using the PKI system. The third aspect is that the time maintained by a TLC can be linked, through certifications using SNTP calibrations of a chain of trusted clocks, all the way to the NTTS or to another commonly accepted source of time. The fourth aspect is that each clock to be certified is specified to maintain at least a certain accuracy over the duration of a valid TCCert. Accordingly, each TCCert can guarantee that the certified clock's time will be within its specified accuracy during the valid period of its TCCert plus the possible temporal variations introduced by the variations due to the accuracy of the foregoing certifying clocks during the valid periods of their respective TCCerts.

4. Trusted Temporal Token Generation and Verification

Once a TLC 206 has a valid TCCert, the TLC 206 is capable of issuing valid trusted temporal tokens. The tokens preferably include a concatenation of the data to be time-stamped and a time stamp supplied by a trusted source of time, in this case, the internal clock of the TLC 206. The signing of the complete message by the TLC 206 functions to bind the data to the time stamp such that the time stamp cannot be altered without detection.

Once a token is generated, it is retained to the requesting application. The requesting application can then verify the authenticity of the token. In addition or in the alternative, the application may pass the token on to another application that may choose to verify the token again in the future.

An application can confirm the authenticity of the token by (1) checking with the NOC 210 that the issuing TLC 206 was in possession of a valid TCCert at the time of token issue, and (2) verifying the signature of the token by obtaining, preferably from the NOC 210, a digital certificate containing the corresponding public key of the TLC 206.

4.1 Token Generation

Figure 7:
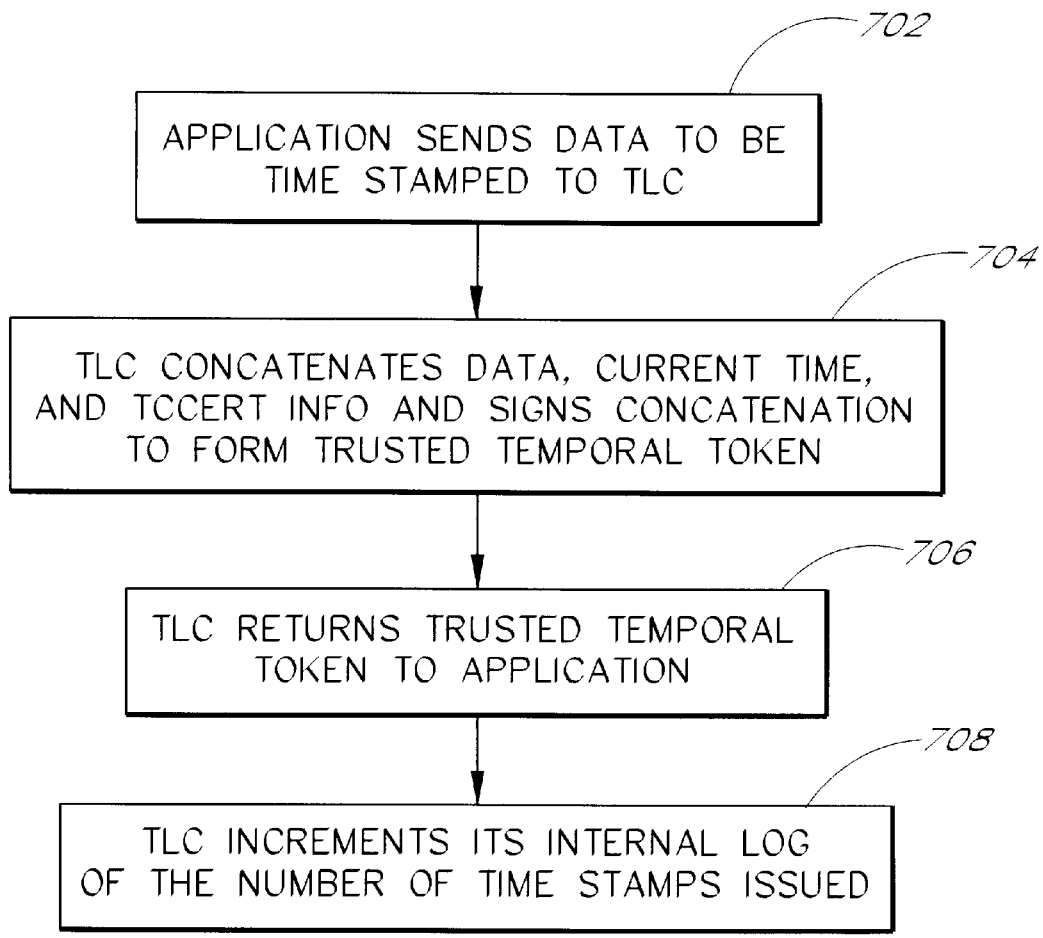
FIG. 7 illustrates a preferred embodiment of the process by which trusted temporal tokens are generated by a Trusted Local Clock.

FIG. 7 illustrates a preferred embodiment of the process by which trusted temporal tokens are generated by a TLC 206. At a first step 702, an application 208 sends a request, including the data to be time stamped, to the issuing TLC 206. The data, in most cases, will comprise a digest, created by a one-way hash function, of the electronic document to be time stamped. At a step 704, the TLC 206 receives the data and concatenates the data with the current time with a TCCert Log Pointer (typically an upper clock ID, a lower clock ID, and the time of the TCCert). The TLC 206 then signs the concatenation to form the trusted temporal token. In an alternative embodiment, the TCCert itself is included rather than the TCCert Log Pointer. At a step 706, the TLC 206 returns the trusted temporal token to the application 208. Thereafter, the TLC 206 increments its internal log of the number of tokens issued for billing purposes. The number is subsequently transmitted, either directly or through a TMC 204, to the NOC 201 for processing and billing.

4.2 Token Verification

Figure 8:
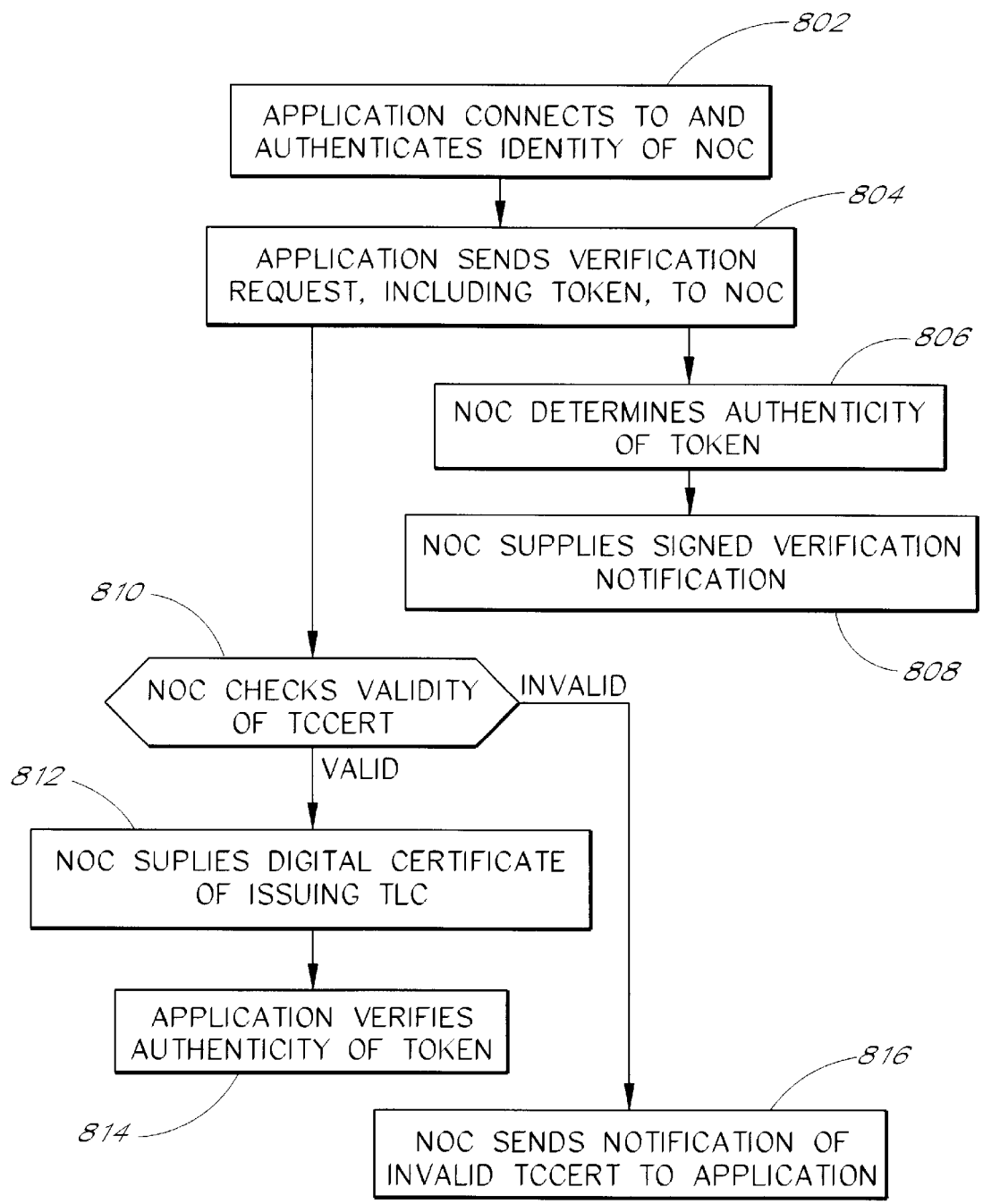
FIG. 8 illustrates a process by which an application can verify the authenticity of a trusted temporal token.

FIG. 8 illustrates a preferred embodiment of the process by which an application can verify the authenticity of a trusted temporal token. At a first step 802, the application connects to and authenticates the identity of the NOC 210. Next, the application sends a verification request, including the token to be verified, to the NOC 210 at a step 804. The NOC 210 maintains a database of all of the TCCerts of all of the clocks in the TTI system. In addition, the NOC 210 either includes or has access to the CA for all of the TTI elements. The CA is the source of digital certificates through which the signatures of the TTI elements can be verified.

From step 804, the preferred embodiment of the present process proceeds to a step 806. At the step 806 the NOC 210 determines the authenticity of the submitted token using the TCCerts in its database and the digital certificate associated with the issuing TLC 206. At a subsequent step 808, the NOC 210 supplies a signed verification notification, indicating the status of the submitted token, to the requesting application.

In an alternative embodiment, the process proceeds to a step 810 from the step 804. At the step 810, the NOC 210 determines whether the issuing TLC 206 was in possession of a valid TCCert. If so, the NOC 210 supplies a digital certificate of the issuing TLC 206 to the requesting application at a step 812. At a step 814, the application confirms the authenticity of the token using the digital certificate to verify the token's signature. If, at step 810, the NOC determines, by checking its databases, that the issuing TLC 206 did not possess a valid TCCert or that the TCCert is suspect, the process proceeds to step 816. At step 816, the NOC 210 sends notification to the requesting application that the token cannot be authenticated.

5. Security Schemes

A number of different schemes can be used in conjunction with the disclosed TTI to ensure that the time stamp contained in a trusted temporal token is indeed derived from a source of trusted time. The schemes have varying advantages and disadvantages and balance increased security with increased verification, processing, and storage costs. The objective of these schemes is to ensure that a trusted temporal token has been issued by a TLC with a valid TCCert.

5.1 Basic Scheme A

A first security scheme relies upon the fact that a TLC has been issued a TCCert within a fixed period previous to the token issue in order to guarantee the validity of an issued time stamp. A TCCert is given a valid duration, such as, for example, seven days, during which the certified TLC can issue time stamps. If a TCCert expires or the TLC is issued a new TCCert, the old TCCert is destroyed by the TLC. In order to check the validity of a token, an application or the NOC 210 checks that the time of a time stamp corresponds to a valid period of the TCCert included in or referenced by the trusted temporal token. The NOC 210 must also check that the TCCert itself is valid by tracing the source of trusted time through additional TCCerts of higher clocks up to the NTTS 202.

5.2 Basic Scheme B

A variation of the previous scheme relies upon the alternative fact that a TLC was issued a valid TCCert within a certain time after issuing a trusted temporal token. In this case, TCCerts are considered valid for a fixed duration, such as seven days, before they are issued. Here, it is assumed if a TLC keeps time to within acceptable limits of NTTS time, the TLC has maintained this time for a reasonable period previous to the certification. In order to implement such a system, the TLCs would have to incorporate a reference to a TCCert that has not yet been issued in each trusted temporal token. The NOC 210 could then associate the references with the later issued TCCerts upon their issuance. The checking of trusted temporal tokens under this scheme could be achieved in a manner similar to the previous scheme.

5.3 High Trust Scheme

A high trust scheme combines the aspects of Basic Schemes A and B above. In this scheme, the NOC checks that a TCCert has been issued to the issuing TLC within a fixed period before and within a fixed period after the issuance of the trusted temporal token. In this case, the trusted temporal token need only contain a reference to the TCCert issued the TLC before the token issue. The NOC can then determine whether a subsequent TCCert has been issued within the requisite time period following the token issuance.

5.4 Alternative Scheme

An alternative scheme provides a similar trust guarantee to scheme A, particularly, that a TLC has been issued a TCCert within a fixed period prior to issuing a trusted temporal token. This scheme, however, eliminates the necessity of archiving all of the individual TCCerts for all of the TLCs in the TTI system. Instead, each TCCert contains the complete TCCert of the issuing clock. In this manner, each TCCert will contain a complete, authenticatable chain of certifications from the NTTS all the way down to the issuing TLC. Instead of cataloguing the TCCerts of all of the individual clocks, each trusted temporal token will contain the complete chain of TCCerts linking the trusted time, from which the token was derived, to the NTTS. The public keys of each of the certifying or issuing clocks would then be made available through the CA 314 of the NOC 210, possibly using an Online Certificate Status Protocol (OCSP) responder 316, so that individual applications can independently verify the validity of trusted temporal tokens and the chain of trusted time leading to its creation.

6. Business Model

A billing scheme can also be integrated into the disclosed invention in order to facilitate the operation of the TTI as part of an on-going business concern. A number of different billing schemes providing various benefits can be used in conjunction with the TTI system.

6.1 Per Stamp Billing

The disclosed system provides mechanisms for TLCs to transmit to the NOC the number of time stamps issued. The NOC can be adapted to log this information and create billing reports for individual clients automatically. In this case clients could be billed for each time stamp issued.

6.2 Flat Rate Certification

An alternative scheme is based upon billing clients for time certification of each TLC located on the clients' premises. In this case, a client pays for each issued TCCert and receives a flat rate on all of the time stamps issued during the valid TCCert period. In this case, the NOC coordinates and automates billing procedures.

6.3 Charges for Verification

In one business model, verification services for issued time stamps are provided free of charge to any entity wanting to check the validity of a time stamp. Alternatively, verification services could be provided for a fee through the NOC.

While certain exemplary preferred embodiments have been described and shown in the accompanying drawings, it is to be understood that such embodiments are merely illustrative of and not restrictive on the broad invention. Further, it is to be understood that this invention is not limited to the specific construction and arrangements shown and described since various modifications or changes may occur to those of ordinary skill in the art without departing from the spirit and scope of the invention as claimed. It is intended that the scope of the invention be limited not by this detailed description but by the claims appended hereto.

What is claimed is:

1. A system for providing a source of time certified to be synchronized with an accepted standard, the system comprising:
    a trusted master clock certified through a first certificate to be synchronized to the accepted standard, the trusted master clock maintained within a secure environment under control of a trusted third party;
    a trusted local clock certified by the trusted master clock through a second certificate to be synchronized with the trusted master clock, the trusted local clock being a tamper-resistant device configured to be located in an insecure environment; and
    a network operations center configured to provide verification information for verifying the certification of the synchronization of clocks within the system, the network operations center maintained within a secure environment under control of a trusted third party.

2. The system of claim 1, wherein the first and second certificates are cryptographically signed and wherein the first certificate and the second certificate can be the same certificate.

3. The system of claim 1, wherein the verification information comprises a public key of a clock.

4. The system of claim 1, wherein the trusted local clock is configured to provide trusted temporal tokens that cryptographically bind data to time.

5. The system of claim 4, wherein the verification information comprises an indication of the validity of a submitted trusted temporal token.

6. The system of claim 1, wherein the network operations center is further configured to receive certification information from the trusted master clock.

7. The system of claim 6, wherein the certification information comprises a time calibration certificate of a certified clock.

8. The system of claim 1, wherein the network operations center is further configured to log time calibration certificates.

9. A system for time stamping digital documents, wherein the time foot which the time stamp is derived is certified to be synchronized to an accepted standard the system comprising:
    a trusted master clock certified to be synchronized to the accepted standard through a first cryptographically signed certificate, the trusted master clock maintained within a secure environment under control of a trusted third party;
    a trusted local clock certified by the trusted master clock to be synchronized with the trusted master clock through a second cryptographically signed certificate, the trusted local clock configured to provide time stamps, the trusted local clock being a tamperresistant device configured to be located in an insecure environment; and
    a network operations center configured to provide time stamp verification information, the network operations center maintained within a secure environment under control of a trusted third party.

10. The system of claim 9, wherein the verification information comprises a time calibration certificate of a certified clock.

11. The system of claim 9, wherein the verification information comprises a public key of a clock.

12. The system of claim 9, wherein the verification information comprises an indication of the validity of a submitted time stamp.

13. The system of claim 9, wherein the network operations center is further configured to log time calibration certificates.

14. A method of providing trusted temporal tokens, the method comprising:

maintaining a red master clock within a secure environment;

causing the trusted master clock to be certified through a first certificate as synchronized with a trusted time server;

certifying a trusted local clock through a second certificate to be synchronized with the trusted master clock, the trusted local clock being configured to provide trusted temporal tokens, the trusted local clock being a tamper-resistant device configured to be located in an insecure environment; and providing busted temporal token verification information in response to verification requests.

15. The method of claim 14, further comprising providing trusted temporal tokens through the trusted local clock in response to time stamping requests.

16. The method of claim 14, wherein the first and second certificates are cryptographically signed and wherein the first certificate and the second certificate can be the same certificate.

17. The method of claim 14, wherein the verification information comprises a public key of a clock.

18. The method of claim 14, wherein the verification information comprises an indication of the validity of a trusted temporal token.

19. The method of claim 14, wherein the verification information is provided by a network operations center, the network operations center being maintained within a secure environment.

20. The method of claim 14, further comprising logging the certifications of the clocks.

21. The method of claim 14, fiber comprising logging the number of trusted temporal tokens issued by the trusted local clock.

22. The method of clam 14, further comprising billing a client based on the number of temporal tokens issued to the client.

23. The method of claim 14, further comprising billing a client in exchange for certifying the synchronization of the trusted local clock.

24. A system for providing time certified to be synchronized with a trusted source, the system comprising:

a trusted clock configured to provide time, the trusted clock certified through a chain of at least two signed certificates to be synchronized to the trusted source, wherein each of the signed certificates certifies that two clocks are synchronized; and a verification module configured to provide verification information for verifying the synchronization of thee trusted clock with the trusted source, wherein the verification module provides the verification information based at least upon the chain of signed certificates.

25. The system of claim 24, wherein the signed certificates are digitally signed.

26. The system of claim 24, wherein the signed certificates are cryptographically signed.

27. The system of claim 24, wherein the verification information comprises at least one of the signed certificates.

28. The system of claim 24, wherein the verification information comprises the signed certificates.

29. The system of claim 24, wherein the verification information comprises an indication that the trusted clock has been certified to be synchronized to the trusted source.

* * * * *

UNITED STATES PATENT AND TRADEMARK OFFICE
CERTIFICATE OF CORRECTION

PATENT NO. : 6,393,126 B1
DATED : May 21, 2002
INVENTOR(S) : van der Kaay et al.

It is certified that error appears in the above-identified patent and that said Letters Patent is hereby corrected as shown below:

Column 16,
Line 46, please delete "foot" and insert therefore, -- from --.
Line 47, after "standard" please add -- , --.

Column 17,
Line 11, please delete "red" and insert therefore, -- trusted --.
Line 22, please delete "busted" and insert therefore, -- trusted --.

Column 18,
Line 3, please delete "fiber" and insert therefore, -- further --.

Signed and Sealed this

Tenth Day of February, 2004

JON W. DUDAS
*Acting Director of the United States Patent and Trademark Office*